US 7,491,769 B2
Feb. 17, 2009

(12) United States Patent
Patel et al.

(10) Patent No.: US 7,491,769 B2
(45) Date of Patent: *Feb. 17, 2009

(54) RUBBER COMPOSITION AND ARTICLE

(75) Inventors: Ben Patel, Niskayuna, NY (US); Brennan Smith, Schenectady, NY (US); Norberto Silvi, Clifton Park, NY (US)

(73) Assignee: Sabic Innovative Plastics IP B.V. (NL)

( * ) Notice: Subject to any disclaimer, the term of this patent is extended or adjusted under 35 U.S.C. 154(b) by 133 days.

This patent is subject to a terminal disclaimer.

(21) Appl. No.: 11/420,859

(22) Filed: May 30, 2006

(65) Prior Publication Data

US 2007/0282066 A1 Dec. 6, 2007

(51) Int. Cl.
C08F 283/08 (2006.01)

(52) U.S. Cl. .............................. 525/68; 525/50; 525/391

(58) Field of Classification Search .................. 525/68
See application file for complete search history.

(56) References Cited

U.S. PATENT DOCUMENTS

| | | | | |
|---|---|---|---|---|
| 3,383,340 A * | 5/1968 | MacCallum et al. | ........ | 524/370 |
| 3,732,174 A | 5/1973 | Nicholas | | |
| 4,760,118 A | 7/1988 | White et al. | | |
| 6,291,563 B1 | 9/2001 | Horne et al. | | |
| 6,306,978 B1 | 10/2001 | Braat et al. | | |
| 6,316,592 B1 | 11/2001 | Bates et al. | | |
| 6,448,327 B1 | 9/2002 | Braat et al. | | |
| 6,469,101 B2 | 10/2002 | Nahmias et al. | | |
| 6,875,812 B1 | 4/2005 | Akiyama et al. | | |
| 6,984,687 B2 | 1/2006 | Henning et al. | | |
| 2005/0228134 A1 | 10/2005 | Xie et al. | | |
| 2005/0277736 A1 | 12/2005 | Ajbani et al. | | |
| 2005/0288393 A1 | 12/2005 | Lean et al. | | |
| 2007/0142552 A1 | 6/2007 | Silvi et al. | | |
| 2007/0142553 A1 | 6/2007 | Perry et al. | | |
| 2007/0142598 A1 | 6/2007 | Silvi et al. | | |

FOREIGN PATENT DOCUMENTS

| | | | |
|---|---|---|---|
| EP | 0292153 A2 | 11/1988 | |
| EP | 0540106 A1 | 5/1993 | |
| EP | 1559586 A1 | 8/2005 | |

OTHER PUBLICATIONS

International Search Report; International Application No. PCT/US2007/068772; International Filing Date Nov. 5, 2007; Date of Mailing: Jul. 26, 2007; 5 pages.
PCT Written Opinion of the International Searching Authority; PCT/US2007/068772; International Filing Date Nov. 5, 2007; 7 pages.
FR2378814; Aug. 25, 1978; Human Translation; 11 pages.
JP-06-287-367; Oct. 11, 1994; Human Translation (35 pages).
JP-2004-210931; Jul. 29, 2004; Human Translation (12 pages).
JP-2002-212339; Jul. 13, 2002; Human Translation (7 pages).
JP-04-285658; Oct. 9, 1992; Human Translation (11 pages).
JP-09-143312; Jun. 3, 1997; Human Translation (8 pages).
JP-2004-035725; Feb. 5, 2000; Human Translation (9 pages).
JP-2001-279026; Oct. 10, 2001; Human Translation (7 pages).
JP-2004-91747; Mar. 25, 2004; Human Translation (11 pages).
JP-06-179752; Jun. 28, 1994; Human Translation (35 pages).
JP 09-087450; Mar. 31, 1997; Human Translation (16 pages).
JP 2001-323107; Nov. 20, 2001; Human Translation (39 pages).
JP-05-271424; Oct. 19, 1993; Human Translation (27 pages).
U.S. Appl. No. 11/305,497; filed Dec. 16, 2005; 40 pages.
U.S. Appl. No. 11/305,450; filed Dec. 16, 2005; 42 pages.
U.S. Appl. No. 11/305,473; filed Dec. 16, 2005; 41 pages.
Servens et al., "Synthesis and characterization of poly[(2,6-dimethyl-1,4-phenylene oxide)-*block*-isoprene] diblock copolymers", Macromol. Chem. Phys., 198, 379-389 (1997).
Wicker et al., "Copolymerization of macromonomers of poly(2,6-dimethyl-1,4-phenylene oxide) with various comonomers", Makromol. Chem. 192, 1371-1385 (1991).
M. Kucera et al., *Collection of Czechoslovak Chemical Communications* (1989), 54(1), 109-16 Abstract Only (2 pages).
Patent Abstracts of Japan; Publication No. 05-271424; Date of Publication of Application Oct. 19, 1993 (2 pages).
Patent Abstracts of Japan; Publication No. 06-287367; Date of Publication of Application Oct. 11, 1994 (1 page).
Patent Abstracts of Japan; Publication No. 09-087450; Date of Publication of Application Mar. 31, 1997 (1 page).
Patent Abstracts of Japan; Publication No. 04-285658; Date of Publication of Application Oct. 9, 1992 (2 pages).
Patent Abstracts of Japan; Publication No. 06-179752; Date of Publication of Application Jun. 28, 1994 (1 page).

(Continued)

*Primary Examiner*—Randy Gulakowski
*Assistant Examiner*—John M Maksymonko
(74) *Attorney, Agent, or Firm*—Cantor Colburn LLP (57) ABSTRACT

A vulcanizable rubber composition including an unsaturated rubber, core-shell particles, and a vulcanizing agent is described. The core-shell particles include a core with poly(arylene ether) and a shell with an ethylenically unsaturated copolymer. Also described are a vulcanized rubber composition and an article that includes it.

21 Claims, 2 Drawing Sheets

OTHER PUBLICATIONS

Patent Abstracts of Japan; Publication No. 09-143312; Date of Publication of Application Jun. 3, 1997 (1 page).

Patent Abstracts of Japan; Publication No. 2001-279026; Date of Publication of Application Oct. 10, 2001 (1 page).

Patent Abstracts of Japan; Publication No. 2001-323107; Date of Publication of Application Nov. 20, 2001 (1 page).

Patent Abstracts of Japan; Publication No. 2002-212339; Date of Publication of Application Jul. 31, 2002 (1 page).

Patent Abstracts of Japan; Publication No. 2004-035725; Date of Publication of Application Feb. 5, 2004 (1 page).

Patent Abstracts of Japan; Publication No. 2004-091747; Date of Publication of Application Mar. 25, 2004 (1 page).

Patent Abstracts of Japan; Publication No. 2004-210931; Date of Publication of Application Jul. 29, 2004 (1 page).

Caplus Abstract for DE4030399A1; Apr. 2, 1992 (2 pages).

* cited by examiner

RUBBER COMPOSITION AND ARTICLE

BACKGROUND OF THE INVENTION

Carbon black has historically been the reinforcing agent of choice for rubber-based products such as tires and extruded and molded goods. Carbon black, which is produced by the thermal decomposition of oil and natural gases, greatly enhances mechanical strength and resistance to abrasion, and it has been an economically attractive approach to improving the physical properties of rubber products. However, the increasing demand for other oil- or gas-derived petrochemicals combined with a decreasing supply of oil and natural gas has prompted searches for a carbon black replacement. One replacement that is currently available is silica.

Silica has also been used as a reinforcing agent for rubber-based compositions but these compositions require the use of a second coupling agent in addition to the sulfur-curing agent required for the rubber. The additional coupling agent is required to graft the silica to the backbone of the rubber polymer. The addition of a coupling agent leads to increased production costs as well as a decrease in the performance of the silica containing rubber composition. Therefore, what is needed are new reinforcing agents that are able to produce vulcanized rubber articles having physical properties that are comparable or superior to those exhibited by articles containing carbon black and/or silica.

BRIEF DESCRIPTION OF THE INVENTION

One embodiment is a rubber composition comprising: a rubber containing ethylenic unsaturation; core-shell particles comprising a core comprising a poly(arylene ether), and a shell comprising an ethylenically unsaturated copolymer; and a vulcanizing agent; wherein the rubber composition is vulcanizable.

Other embodiments, including a vulcanized rubber composition and an article comprising the vulcanized rubber composition, are described in detail below.

DETAILED DESCRIPTION OF THE INVENTION

One embodiment is a core-shell particle, comprising: a core comprising a first poly(arylene ether); and a shell comprising an ethylenically unsaturated copolymer; wherein the ethylenically unsaturated copolymer is a block or graft copolymer comprising at least one first segment comprising a poly(alkenyl aromatic) or a second poly(arylene ether), and at least one second segment comprising a poly(conjugated diene). The core-shell particle of some embodiments can be used as a filler in natural and/or synthetic rubber compositions to improve properties including heat build up (HBU). One advantage of the vulcanizable rubber composition of some embodiments is that the coated poly(arylene ether) particles of the composition can be covalently crosslinked to a rubber matrix without the use of coupling agents other than sulfur, which reduces cost relative to silica-containing rubber compositions that require special coupling agents.

The core-shell particle's core comprises a first poly(arylene ether). In one embodiment, the first poly(arylene ether) comprises repeating structural units having the formula wherein for each structural unit, each $Z^1$ is independently halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_2$-$C_{12}$ halohydrocarbyloxy wherein at least two carbon atoms separate the halogen and oxygen atoms. In one embodiment, the first poly(arylene ether) comprises a homopolymer of 2,6-dimethylphenol, a copolymer of 2,6-dimethylphenol and 2,3,6-trimethylphenol, or a mixture thereof. There is no particular limit on the molecular weight or intrinsic viscosity of the first poly(arylene ether). In one embodiment, the first poly(arylene ether) has an intrinsic viscosity of about 0.05 to about 1 deciliter per gram, measured at 25° C. in chloroform. Within this range, the intrinsic viscosity may be at least about 0.1 deciliter per gram, or at least about 0.2 deciliter per gram, or at least about 0.3 deciliter per gram. Also within this range, the intrinsic viscosity may be up to about 0.8 deciliter per gram, or up to about 0.6 deciliter per gram.

In one embodiment, the first poly(arylene ether) comprises a capped poly(arylene ether). The terminal hydroxy groups may be capped with a capping agent via an acylation reaction, for example. The capping agent chosen is desirably one that results in a less reactive poly(arylene ether) thereby reducing or preventing crosslinking of the polymer chains and the formation of gels or black specks during processing at elevated temperatures. Suitable capping agents include, for example, esters of salicylic acid (such as salicylic carbonate and linear polysalicylates), anthranilic acid, and substituted derivatives thereof. As used herein, the term "ester of salicylic acid" includes compounds in which the carboxy group, the hydroxy group, or both have been esterified. Suitable salicylates include, for example, aryl salicylates such as phenyl salicylate, acetylsalicylic acid, salicylic carbonate, and polysalicylates, including both linear polysalicylates and cyclic compounds such as disalicylide and trisalicylide. In one embodiment, the capping agent is chosen from salicylic carbonate and the polysalicylates, especially linear polysalicylates. When capped, the poly(arylene ether) may be capped to any desirable extent up to 80 percent, more specifically up to about 90 percent, and even more specifically up to 100 percent of the hydroxy groups are capped. Suitable capped poly(arylene ether) and their preparation are described in U.S. Pat. Nos. 4,760,118 to White et al. and 6,306,978 to Braat et al.

Capping poly(arylene ether) with polysalicylate is also believed to reduce the amount of aminoalkyl terminated groups present in the poly(arylene ether) chain. The aminoalkyl groups are the result of oxidative coupling reactions that employ amines in the process to produce the poly(arylene ether). The aminoalkyl group, ortho to the terminal hydroxy group of the poly(arylene ether), can be susceptible to decomposition at high temperatures. The decomposition is believed to result in the regeneration of primary or secondary amine and the production of a quinone methide end group, which may in turn generate a 2,6-dialkyl-1-hydroxyphenyl end group. Capping of poly(arylene ether) containing aminoalkyl groups with polysalicylate is believed to remove such amino groups to result in a capped terminal hydroxy group of the polymer chain and the formation of 2-hydroxy-N,N-alkyl-benzamine (salicylamide). The removal of the amino group and the capping provides a poly(arylene ether) that is more stable to high temperatures, thereby resulting in fewer degradative products, such as gels or black specks, during processing of the poly(arylene ether).

In addition to the first poly(arylene ether), the core may, optionally, further comprise a poly(alkenyl aromatic). The term "poly(alkenyl aromatic)" as used herein includes polymers prepared by methods known in the art including bulk, suspension, and emulsion polymerization, which contain at least 25% by weight of structural units derived from an alkenyl aromatic monomer of the formula wherein $R^3$ is hydrogen, $C_1$-$C_8$ alkyl, halogen, or the like; Z is vinyl, halogen, $C_1$-$C_8$ alkyl, or the like; and p is 0, 1, 2, 3, 4, or 5. In one embodiment, the alkenyl aromatic monomer is chose from styrene, chlorostyrenes such as p-chlorostyrene, and methylstyrenes such as p-methylstyrene. The poly(alkenyl aromatic) resins include homopolymers of an alkenyl aromatic monomer; random copolymers of an alkenyl aromatic monomer, such as styrene, with one or more different monomers such as acrylonitrile, butadiene, alpha-methylstyrene, ethylvinylbenzene, divinylbenzene and maleic anhydride; and rubber-modified poly(alkenyl aromatic) resins comprising blends and/or grafts of a rubber modifier and a homopolymer of an alkenyl aromatic monomer (as described above), wherein the rubber modifier may be a polymerization product of at least one $C_4$-$C_{10}$ nonaromatic diene monomer, such as butadiene or isoprene. The rubber-modified poly(alkenyl aromatic) resin may comprise about 98 to about 70 weight percent of the homopolymer of an alkenyl aromatic monomer and about 2 to about 30 weight percent of the rubber modifier. The rubber-modified poly(alkenyl aromatic) resin may, optionally, comprise rubber domains with dimensions of about 2 to about 20 micrometers. In one embodiment, the poly(alkenyl aromatic) is chosen from homopolystyrenes, rubber-modified polystyrenes, and mixtures thereof. The poly(alkenyl aromatic) resins further include linear, tapered, and radial nonelastic block copolymers of styrene and butadiene containing at least about 65 weight percent styrene, more specifically at least about 70 weight percent styrene. When present in the core, the poly(alkenyl aromatic) may be used in an amount of about 5 to about 200 weight percent, relative to the amount of first poly(arylene ether).

In addition to a core comprising first poly(arylene ether), the core-shell particle comprises a shell comprising an ethylenically unsaturated copolymer. The ethylenically unsaturated copolymer is a block or graft copolymer comprising at least one first segment comprising a poly(alkenyl aromatic) or a second poly(arylene ether), and at least one second segment comprising a poly(conjugated diene). The first poly(arylene ether) used to form the core may be the same as or different from the second poly(arylene ether) that may constitute the at least one first segment of the ethylenically unsaturated copolymer. The above compositional description of the first poly(arylene ether) of the particle core applies to the second poly(arylene ether) that may be used as the at least one first segment of the ethylenically unsaturated copolymer. The above compositional description of the poly(alkenyl aromatic) optionally present in the core also applies to the poly(alkenyl aromatic) that may be used as the at least one first segment. In one embodiment, the poly(alkenyl aromatic) that may be used as the at least one first segment is a homopolystyrene.

The ethylenically unsaturated copolymer may comprise about 2 to about 60 weight percent of the at least one first segment and about 40 to about 98 weight percent of the at least one second segment. Within the above range, the first segment amount may be at least about 5 weight percent, or at least about 10 weight percent; the first segment amount may also be up to about 50 weight percent, or up to about 40 weight percent, or up to about 30 weight percent. Within the above range, the second segment amount may be at least about 50 weight percent, or at least about 60 weight percent, or at least about 70 weight percent; the second segment amount may also be up to about 95 weight percent, or up to about 90 weight percent.

Specific, suitable ethylenically unsaturated copolymers include, for example, polystyrene-polyisoprene diblock copolymers, polystyrene-polyisoprene-polystyrene triblock copolymers, polystyrene-polybutadiene diblock copolymers, polystyrene-polybutadiene-polystyrene triblock copolymers, poly(arylene ether)-polyisoprene diblock copolymers, poly(arylene ether)-polybutadiene diblock copolymers, poly(arylene ether)-polyisoprene-poly(arylene ether) triblock copolymers, poly(arylene ether)-polybutadiene-poly(arylene ether) triblock copolymers, polystyrene-polybutadiene graft copolymers, polystyrene-polyisoprene graft copolymers, poly(arylene ether)-polybutadiene graft copolymers, poly(arylene ether)-polyisoprene graft copolymers, and the like, maleic-anhydride-grafted derivatives of the foregoing polymers, partially hydrogenated derivatives of the foregoing copolymers, and mixtures thereof. In one embodiment, the ethylenically unsaturated copolymer comprises a polystyrene-polyisoprene-polystyrene triblock copolymer.

The ethylenically unsaturated copolymer may, optionally, comprise sulfur functionalization. Such sulfur functionalization may be incorporated via reaction of the ethylenically unsaturated copolymer with a thio acid and having the formula wherein $R^1$ is independently at each occurrence an aliphatic radical, a cycloaliphatic radical, or an aromatic radical; L is independently at each occurrence a monovalent group or a polyvalent group that is an aliphatic radical, a cycloaliphatic radical, or an aromatic radical; Q is independently at each occurrence oxygen, sulfur, or an $NR^2$ group, wherein $R^2$ is an aliphatic radical, a cycloaliphatic radical, or an aromatic radical; J is carbon, sulfur, phosphorus, or a sulfonyl group; E is oxygen or sulfur; S comprises one or more sulfur atoms; "t" is an integer that is equal to 0, 1, 2, 3, 4, or 5; "j" is equal to 0 or 1; "k" is equal to 1 if J is carbon, sulfur or sulfonyl; "k" is equal to 2 if J is phosphorus; and "z" is equal to 0, 1, or 2. In one embodiment, the thio acid comprises a $C_2$-$C_{12}$ thioalkanoic acid. The reaction product of the ethylenically unsaturated copolymer and the thio acid is a sulfur-functionalized copolymer capable of reacting with a rubber matrix during vulcanization.

While the invention has been described in terms of a shell comprising an ethylenically unsaturated copolymer, it is also possible to prepare core shell particles having other shell materials. Broadly speaking, the shell polymer may be any block or graft copolymer having at least one first segment miscible with the core first poly(arylene ether) and at least one segment immiscible with the core first poly(arylene ether). In addition to the ethylenically unsaturated copolymers described above, the shell may comprise, for example, a block or graft copolymer comprising at least one first segment comprising a polystyrene or a second poly(arylene ether) and at least one second segment comprising a polyolefin. Such copolymers are known in the art. For example, preparation of a graft copolymer of 2,6-dimethylphenol and ethylene is described in M. Kucera et al., *Collection of Czechoslovak Chemical Communications* (1989), 54(1), 109-16; a graft copolymer of 2,6-dimethylphenol, ethylene, and propylene is described in European Patent Application No. EP 292153 A2 to Sakashita et al.; block/graft copolymers of 2,6-dimethylphenol and propylene are described in Japanese Patent Application Publication No. JP 05-271424 A2 of Ishihara et al. and German Patent Application Publication No. DE 4030399 A1 to Schweier et al.; block copolymers of 2,6-dimethylphenol and propylene are described in Japanese Patent Application Nos. JP 06-287367 A2 and JP 06-179752 A2 of Tomita et al., and JP 09-087450 A2 to Shoji et al. The core-shell particle may comprise the core (first) poly(arylene ether) and the shell ethylenically unsaturated copolymer over a wide range of relative amounts. For example, the core-shell particle may comprise about 20 to about 95 weight percent of the first poly(arylene ether) and about 5 to about 80 weight percent of the ethylenically unsaturated copolymer. Within these ranges, the first poly(arylene ether) amount may be at least about 40 weight percent, or at least about 60 weight percent; the first poly(arylene ether) amount may also be up to about 90 weight percent, or up to about 80 weight percent. Also within these ranges, the ethylenically unsaturated copolymer amount may be at least about 10 weight percent, or at least about 20 weight percent; the ethylenically unsaturated copolymer amount may also be up to about 60 weight percent, or up to about 40 weight percent.

The core and shell of the particle may vary considerably in their dimensions. For example, the core may have an average diameter of about 10 nanometers to about 10 micrometers. Within this range, the core may have an average diameter of at least about 20 nanometers or at least about 50 nanometers. Also within this range, the core may have an average diameter of up to about 5 micrometers, or up to about 1 micrometer. The shell may have an average thickness of about 1 to about 500 nanometers. Within this range, the shell may have an average thickness of at least about 5 nanometers, or at least about 10 nanometers. Also within this range, the shell may have an average thickness of up to about 200 nanometers, or up to about 100 nanometers. These dimensions of the core-shell particle may be controlled via the precipitation conditions and determined by using electron microscopy to analyze particle cross sections treated with osmium tetroxide to preferentially stain alkene-rich polymers, such as the second (poly(conjugated diene) segment of the ethylenically unsaturated copolymer. It will be understood that the core may comprise, in addition to the first poly(arylene ether), first segment(s) of the ethylenically unsaturated copolymer that are miscible with the core (first) poly(arylene ether) (e.g., polystyrene segments of a polystyrene-polyisoprene-polystyrene triblock copolymer, or (second) poly(arylene ether) segments of a poly(arylene ether)-polybutadiene diblock copolymer).

The core-shell particle may also vary considerably in its surface area. For example, the core-shell particle may have a surface area of about 10 to about 500 square meters per gram. Within this range, the surface area may be at least about 20 square meters per gram, or at least about 40 square meters per gram. Also within this range, the surface area may be up to about 300 square meters per gram, or up to about 100 square meters per gram. The surface area of the core-shell particles may be determined according to ASTM D 6556-04 ("Standard Test Method for Carbon Black—Total and External Surface Area by Nitrogen Adsorption"). For example, the following test procedure may be used. The samples are purged at 40° C. for 3 hours prior to analysis. Samples are degassed in a Coulter SA 3100 Series Surface Area Analyzer. A multipoint BET (Brunauer, Emmett, and Teller) analysis is conducted using the following analysis parameters:

Adsorbate Gas: Nitrogen
Cryogen: Liquid Nitrogen
Pressure Sequence: 0.00-0.20 P/Po
Sample Weights: ~0.04-0.10 g.

The volume of gas adsorbed is measured at relative pressures to get the BET surface area. The BET surface area number is extracted from the regression line of the transformation plot and constants for the molecular area of nitrogen. Error in the BET value is calculated from the slope and intercept error in the regression line.

Additives known in the thermoplastics art may be used in the core, the shell, or both. Thus, in one embodiment, the core and/or the shell further comprises an additive chosen from stabilizers, processing aids, nucleating agents, antioxidants, antistatic agents, and the like, and mixtures thereof.

One embodiment is a core-shell particle, comprising: a core comprising a poly(arylene ether) comprising a homopolymer of 2,6-dimethylphenol, a copolymer of 2,6-dimethylphenol and 2,3,6-trimethylphenol, or a mixture thereof, and a shell comprising a polystyrene-polyisoprene diblock copolymer, a polystyrene-polyisoprene-polystyrene triblock copolymer, or a mixture thereof; wherein the core-shell particle has a surface area of about 10 to about 500 square meters per gram.

One embodiment is a core-shell particle, comprising: a core comprising a poly(arylene ether) comprising a homopolymer of 2,6-dimethylphenol, a copolymer of 2,6-dimethylphenol and 2,3,6-trimethylphenol, or a mixture thereof, and a shell comprising a polystyrene-polyisoprene-polystyrene triblock copolymer; wherein the core-shell particle comprises about 30 to about 90 weight percent of the poly(arylene ether) and about 10 to about 70 weight percent of the polystyrene-polyisoprene-polystyrene triblock copolymer; and wherein the core-shell particle has a surface area of about 10 to about 500 square meters per gram.

Additional embodiments include compositions comprising any of the above-described core-shell particles and articles comprising such compositions. For example, the particles of some embodiments are useful to improve the physical properties of articles including cable sheaths, hoses, transmission belts, conveyor belts, roller coatings, packing rings, damping elements, and shoe soles.

Another embodiment is a process for preparing core-shell particles, comprising: spraying a polymer solution mist into an antisolvent to precipitate core-shell particles; wherein the polymer solution mist comprises droplets of a polymer solution comprising a poly(arylene ether), an ethylenically unsaturated copolymer, and a solvent; and wherein the core-shell particles comprise a core comprising the poly(arylene ether) and a shell comprising the ethylenically unsaturated copolymer; isolating the precipitated core-shell particles; resuspending the precipitated core-shell particles in an antisolvent to form a resuspension; exposing the resuspension to shear; isolating the core-shell particles from the resuspension; drying the isolated core-shell particles; and mechanically shearing the dried core-shell particles.

In this method the polymer solution mist comprises polymer solution droplets and a carrier gas, which, in one embodiment, is an inert gas such as nitrogen, argon, or the like. The solvent used to prepare the polymer solution may be any solvent capable of dissolving both the poly(arylene ether) and the ethylenically unsaturated copolymer. Suitable solvents include, for example, aromatic hydrocarbons, halogenated aromatic hydrocarbons, halogenated alkanes, tetrahydrofuran, and mixtures thereof. In one embodiment, the solvent comprises tetrahydrofuran or toluene. In one embodiment, the polymer solution comprises about 0.5 to about 10 weight percent total of the poly(arylene ether) and the ethylenically unsaturated copolymer. Within this range, the total amount of poly(arylene ether) and ethylenically unsaturated copolymer may be at least about 1 weight percent, or at least about 3 weight percent; it may also be up to about 7 weight percent. In one embodiment, the polymer solution comprises the poly (arylene ether) and the ethylenically unsaturated copolymer in a weight ratio of about 1:4 to about 20:1. Within this range, the weight ratio may be at least about 3:7 or at least about 1:1. Also within this range, the weight ratio may be up to about 9:1, or up to about 4:1. The conditions for spraying the polymer solution will vary according to the desired particle size, but suitable conditions include spraying the polymer solution through a nozzle at a pressure of about 100 to about 500 kilopascals to produce droplets having a diameter of about 5 to about 100 micrometers. In one embodiment, the nozzle comprises a hollow cone with an acute spray angle less than or equal to 70°. Within the above pressure range, the pressure may be at least about 200 kilopascals, or up to about 400 kilopascals. Within the above droplet diameter range, the droplet diameter may be at least about 20 micrometers, or at least about 40 micrometers; it may also be up to about 150 micrometers, or up to about 100 micrometers.

The antisolvent used to precipitate the core-shell particles may comprise a $C_3$-$C_{20}$ solvent comprising at least one ketone, ester, or ether moiety. Suitable antisolvents include, for example, acetone, methyl ethyl ketone, methyl formate, methyl acetate, ethyl acetate, 1,2-dimethoxy ethane (glyme), bis(2-methoxyethyl ether) (diglyme), and the like, and mixtures thereof. In one embodiment, the antisolvent comprises methyl ethyl ketone and methanol in a weight ratio of about 1:2 to about 5:1. Within this range, the weight ratio may be at least about 1:1, or up to about 3:1. In one embodiment, spraying the polymer solution mist into an antisolvent comprises agitating the antisolvent. For example, the polymer solution may be sprayed into a Waring lab blender having a cup volume of about 1 liter; the cup is modified to accommodate continuous flow; the volume in the cup including antisolvent and polymer solution/precipitate is held constant about 300±40 milliliters; the shear is held constant at 10,000 rotations per minute. Spraying the polymer solution mist into the antisolvent may comprise combining the polymer solution and the antisolvent in a weight ratio of about 1:20 to about 2:1.

In the above method, the step, "isolating the precipitated core-shell particles" may utilize any method that substantially separates the precipitated core-shell particles from the solvent and antisolvent. Suitable methods include, for example, filtration, sedimentation, decantation, solid/liquid centrifugation, and combinations thereof. In one embodiment, isolating the precipitated core-shell particles comprises isolating the particles as a wet cake via filtration.

The method comprises exposing the resuspension to shear. While not wishing to be bound by any particular hypothesis, the inventors believe that this step facilitates removal of solvent that would otherwise reduce the melting point of the shell material and thereby permit undesirable sintering of particles during the subsequent drying step. Shearing the resuspension may be carried out, for example, as follows: the wet filter cake is added to 3 liters of pure methanol in a 4 liter Waring blender or 8 liters pure methanol in a 15 liter bucket (depending on scale); the filter cake is then resuspended for about 1 to 3 hours at either about 2,000 to about 20,000 rotations per minute (rpm) or about 1,000 to about 12,000 rpm, respectively; the resuspension is then filtered using a Buchner funnel and washed with pure methanol.

The method includes drying the isolated core-shell particles. It will be understood that "drying" generally refers to removal of volatile impurities and is not limited to removal of water. Drying the isolated core-shell particles should be conducted at a temperature and pressure effective to remove volatiles without allowing sintering (fusion) of the particles. For example, drying may be conducted at a temperature of about 20 to about 40° C. and an absolute pressure of about 0.1 to about 100 kilopascals.

The method comprises mechanically shearing the dried core-shell particles. For example, the following method may be used: after removal of solvent by vacuum at no more than 40° C., particles are added to a Waring lab blender the cup volume of which is either 1 or 4 liters; the particles are then sheared for up to about 1 hour, taking care not to let the heat from friction elevate the temperature above 40° C.; the blender rpm is varied from about 2,000 to about 20,000 rpm for the duration; intermittently the shear is stopped completely and the particles that have gathered around the side of the cup and under the blades are brushed down, then shear is continued.

The method may, optionally, further comprise sieving the mechanically sheared, dried core-shell particles. For instance, the working examples below use a 40-micrometer sieve. Since the sieve opening size is generally much larger than the particle diameter, such sieving primarily functions to remove large aggregates of the core-shell particles.

One embodiment is a process for preparing core-shell particles, comprising: spraying a polymer solution mist into an antisolvent to precipitate core-shell particles; wherein the polymer solution mist comprises droplets of a polymer solution comprising a poly(arylene ether), an ethylenically unsaturated copolymer, and a solvent comprising tetrahydrofuran; wherein the polymer solution comprises about 1 to about 7 weight percent total of the poly(arylene ether) and the ethylenically unsaturated copolymer; wherein the polymer solution comprises the poly(arylene ether) and the ethylenically unsaturated copolymer in a weight ratio of about 3:7 to about 9:1; wherein the antisolvent comprises methyl ethyl ketone and methanol in a weight ratio of about 1:2 to about 5:1; and wherein said spraying a polymer solution mist into an antisolvent comprises combining the polymer solution and the antisolvent in a weight ratio of about 1:20 to about 2:1; isolating the precipitated core-shell particles; resuspending the precipitated core-shell particles in an antisolvent to form a resuspension; exposing the resuspension to shear; isolating the core-shell particles from the resuspension; drying the core-shell particles; and mechanically shearing the dried core-shell particles; wherein the core-shell particles comprise a core comprising the poly(arylene ether) and a shell comprising the ethylenically unsaturated copolymer; and wherein the core-shell particles have a surface area of about 10 to about 100 square meters per gram.

Additional embodiments include core-shell particles prepared by any of the above-described methods.

One embodiment is a rubber composition comprising: a rubber containing ethylenic unsaturation; core-shell particles comprising a core comprising a poly(arylene ether), and a shell comprising an ethylenically unsaturated copolymer; and a vulcanizing agent; wherein the rubber composition is vulcanizable. A "vulcanizable" rubber composition is a rubber composition that is capable of being vulcanized. In this embodiment, the rubber containing ethylenic unsaturation may be any elastomer containing ethylenic unsaturation and having a glass transition temperature below room temperature. Suitable ethylenically unsaturated rubbers include natural rubbers, synthetic rubbers, and mixtures thereof.

Representative examples of suitable synthetic rubbers include solution styrene-butadiene rubber (sSBR), emulsion styrene-butadiene rubber (eSBR), styrene-butadiene rubber (SBR), chloroprene rubber, isoprene rubber (IR), isoprene-isobutylene rubber (IIR), polybutadiene (BR), ethylene-propylene-diene monomer terpolymer (EPDM), acrylonitrile-butadiene rubber (NBR), polysiloxanes comprising ethylenic unsaturation, polyurethanes containing ethylenic unsaturation, and mixtures thereof.

In this embodiment, the rubber containing ethylenic unsaturation comprises a diene-based synthetic rubber. Suitable diene-based synthetic rubber may be derived at least in part (as a homopolymer or a copolymer) from diene monomers, that is, monomers having two carbon-carbon double bonds, whether conjugated or not. In one embodiment, the diene-based synthetic rubber may be derived from at least one conjugated diene monomer. In one embodiment, the diene-based synthetic rubber may be derived from at least one nonconjugated diene monomer. In one embodiment, the diene-based synthetic rubber may be derived from at least one conjugated diene monomer and at least one alkenyl aromatic monomer. In one embodiment, the diene-based synthetic rubber may be derived from at least one conjugated diene monomer and at least one ethylene monomer and at least one alkylene monomer. Suitable conjugated dienes may include, for example, 1,3-butadiene, 2-methyl-1,3-butadiene (isoprene), 2,3-di($C_1$-$C_5$-alkyl)-1,3-butadienes (such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene), phenyl-1,3-butadiene, 2-chloro-1,3-butadiene, 1,3-pentadiene, 2,4-hexadiene, 1,4-hexadiene, ethylidenenorbornene, dicyclopentadiene, and the like, and mixtures thereof. Suitable alkenyl aromatic monomers are described above in the description of the core-shell polymer. In one embodiment, the alkenyl aromatic monomer comprises styrene.

Specific, suitable unsaturated rubbers include, for example, cis-1,4-polyisoprene rubber (natural and/or synthetic), emulsion polymerized styrene/butadiene copolymer rubber, organic solution polymerized styrene/butadiene rubber, 3,4-polyisoprene rubber, isoprene/butadiene rubber, polystyrene/polyisoprene/polybutadiene terpolymer rubber, cis-1,4-polybutadiene, medium vinyl polybutadiene rubber (about 35 percent to about 50 percent vinyl), high vinyl polybutadiene rubber (about 50 percent to about 75 percent vinyl), styrene/isoprene copolymers, emulsion polymerized styrene/butadiene/acrylonitrile terpolymer rubber, butadiene/acrylonitrile copolymer rubber, and the like, and mixtures thereof. When the unsaturated rubber is a solution polymerized SBR (sSBR), it may have bound styrene content (i.e., a polystyrene content) of about 5 to about 60 percent. A suitable emulsion polymerized styrene/butadiene (eSBR) may have a bound styrene content of, for example, about 20 percent to about 28 percent bound styrene. In one embodiment, an eSBR having a medium to relatively high bound styrene content, namely, a bound styrene content of about 30 percent to about 45 percent may be used. Emulsion polymerized styrene/butadiene/acrylonitrile terpolymer rubbers may contain from about 2 weight percent to about 40 weight percent bound acrylonitrile in the terpolymer, which may be used as the unsaturated elastomer. A suitable polybutadiene elastomer may have about 90 weight percent or more cis-1,4-content. Blends of the above-mentioned rubbers may be selected having an elastomer content and ratio selected with reference to the end-use for the material.

In addition to the unsaturated rubber, the vulcanizable rubber composition comprises core-shell particles, which are described above. The vulcanizable rubber composition may comprise about 1 to about 70 parts by weight of the core-shell particles per 100 parts by weight total of the rubber containing ethylenic unsaturation and the ethylenically unsaturated copolymer. Within this range, the core-shell particles amount may be at least about 4 parts by weight, or at least about 8 parts by weight. Also within this range, the core-shell particles amount may be up to about 50 parts by weight, or up to about 40 parts by weight, or up to about 30 parts by weight.

In addition to the unsaturated rubber and the core-shell particles, the vulcanizable composition comprises a vulcanizing agent. In one embodiment, the vulcanizing agent is a sulfur donor. Representative examples of sulfur donors include elemental sulfur (free sulfur), an amine disulfide, polymeric polysulfide, and sulfur olefin adducts. In one embodiment, the vulcanizing agent is elemental sulfur. The vulcanizing agent may be used in an amount effective to vulcanize the composition. In one embodiment, the amount of vulcanizing agent is about 0.1 to 10 parts by weight per 100 parts by weight total of the rubber containing ethylenic unsaturation and the ethylenically unsaturated copolymer. Within this range, the vulcanizing agent amount may be at least about 0.5 parts by weight, or at least 1.5 parts by weight. Also within this range, the vulcanizing agent amount may be up to about 8 parts by weight, or up to about 6 parts by weight. In addition to vulcanizing the unsaturated rubber, the vulcanizing agent may graft the core-shell particles to the rubber via polysulfide linkages.

Vulcanization accelerators, i.e., additional sulfur donors, may also be used. Vulcanization accelerators include, for example, benzothiazole, alkyl thiuram disulfide, guanidine derivatives and thiocarbamates. Specific examples include, for example, 2-mercaptobenzothiazole, tetramethylthiuram disulfide, benzothiazole disulfide, diphenylguanidine, zinc dithiocarbamate, alkylphenol disulfides, zinc butyl xanthate, N-dicyclohexyl-2-benzothiazolesulfenamide, N-cyclohexyl-2-benzothiazolesulfenamide, N-oxydiethylenebenzothiazole-2-sulfenamide, N,N-diphenylthiourea, dithiocarbamylsulfenamide, N,N-diisopropyl-benzothiozole-2-sulfenamide, zinc-2-mercaptotoluimidazole, dithiobis(N-methylpiperazine), dithiobis(N-beta-hydroxy ethyl piperazine) and dithiobis(dibenzyl amine). Other additional sulfur donors may be, for example, thiuram and morpholine derivatives. Representative of such donors are, for example, but not limited to, dimorpholine disulfide, dimorpholine tetrasulfide, tetramethylthiuram tetrasulfide, benzothiazyl-2, N-dithiomorpholide, thioplasts, dipentamethylenethiuram hexasulfide, and disulfidecaprolactam.

The vulcanizable rubber composition may, optionally, further comprise about 1 to about 50 weight percent of an additional filler, based on the total weight of the composition. Within this range, the additional filler amount may be up to about 25 weight percent. Suitable fillers include precipitated silica, fumed silica, carbon black, and mixtures thereof. If silica filler is used, it may be used in conjunction with a coupling agent. Suitable coupling agents and methods for their use are known in the art.

The vulcanizable rubber composition may, optionally, further comprise additives such as, for example, activators, retarders, processing additives (such as oils), resins (including tackifying resins), plasticizers, antioxidants, thermal stabilizers, waxes, antiozonants, deblocking agents, pigments, peptizing agents (such as pentachlorothiophenol and dibenzamidodiphenyl disulfide), and the like, and mixtures thereof.

As the vulcanizable composition is defined as comprising multiple components, it will be understood that each component is chemically distinct, particularly in the instance that a single chemical compound may satisfy the definition of more than one component.

In practice, sulfur vulcanized rubber products typically are prepared by thermomechanically mixing rubber and various ingredients in a sequentially step-wise manner followed by shaping and curing the compounded rubber to form a vulcanized product. First, for the aforesaid mixing of the rubber and various ingredients, typically exclusive of sulfur and sulfur vulcanization accelerators (collectively "curing agents"), the rubber(s) and various rubber compounding ingredients are usually blended in at least one, and often (in the case of silica filled low rolling resistance tires) two, preparatory thermomechanical mixing stage(s) in suitable mixers. Such preparatory mixing is referred to as non-productive mixing or non-productive mixing steps or stages. Such preparatory mixing usually is conducted at a temperature of about 140° C. to about 200° C. The coated poly(arylene ether) particles of the present invention can then be blended to the mixtures resulting form this process to produce a vulcanizable rubber composition comprising ethylenic unsaturated coated poly(arylene ether) particles.

The above described process may also comprise the additional steps of preparing an assembly of sulfur vulcanizable rubber and vulcanizing the assembly at a temperature of about 130° C. to about 200° C.

One embodiment is a vulcanizable rubber composition comprising: a rubber containing ethylenic unsaturation, chosen from natural rubber, styrene-butadiene random copolymers, polybutadienes, polyisoprenes, and mixtures thereof; core-shell particles comprising a core comprising a poly(arylene ether), and a shell comprising an ethylenically unsaturated copolymer; wherein the poly(arylene ether) comprises a homopolymer of 2,6-dimethylphenol, a copolymer of 2,6-dimethylphenol and 2,3,6-trimethylphenol, or a mixture thereof; and wherein the core-shell particles have a surface area of about 10 to about 500 square meters per gram; and a vulcanizing agent chosen from elemental sulfur, amine disulfides, polymeric polysulfides, sulfur olefin adducts, and mixtures thereof.

Additional embodiments include vulcanized rubber compositions obtained on vulcanizing any of the above-described vulcanizable compositions.

Other embodiments include articles comprising any of the vulcanized compositions. Such articles include, for example, cable sheaths, hoses, transmission belts, conveyor belts, roller coatings, packing rings, damping elements, and shoe soles.

The invention is further illustrated by the following non-limiting examples.

EXAMPLE 1

Seventy (70) grams of poly(2,6-dimethyl-1,4-phenylene ether) (PPE; obtained from GE Plastics and having an intrinsic viscosity of about 0.31 deciliter per gram) is added to 3.3 liters (L) of tetrahydrofuran along with 30 grams of a mixture of 55 weight percent polystyrene-polyisoprene diblock copolymer and 45 weight percent polystyrene-polyisoprene-polystyrene triblock copolymer (SI+SIS; obtained as KRATON® D1113P from Kraton Polymers and having a polystyrene content of 16 weight percent and a polyisoprene content of 84 weight percent) at 40° C. to make a 3% polymer solution. The PPE/(SI+SIS) solution is stirred until homogeneous.

Antisolvent solution: Six and two-tenths (6.2) L of methyl ethyl ketone (MEK) are combined with 4.1 L of methanol (MeOH) to make 10.3 L of antisolvent solution wherein the ratio by volume of MEK to MeOH is 1.5:1.0 and the total volume of the antisolvent solution is three times the total volume of the PPE/(SI+SIS) solution.

Charging the System: The poly(arylene ether) solution is allowed to come to room temperature then is immediately added to the pressure vessel. The vessel is sealed and pressurized using nitrogen gas (N2) to a pressure of 60 pounds per square inch (psi).

Priming the System: The antisolvent solution is added to a high shear precipitation vessel (HSPV; e.g., a one liter Waring model 38BL54 lab blender; for larger scales, a four liter Waring model 38BL22 lab blender or a fifteen liter GAST Lightnin series 30 air drive bucket blender may be used) to a volume of 300±40 milliliters while the HSPV is running at about 10,000 rpm. The flow rate of the antisolvent pump is set to 90 milliliters per minute (mL/min) in order to maintain a constant 3:1 antisolvent:polymer solution flow rate. The pressure vessel is positioned such that the spray nozzle is central to vortex of antisolvent inside the HSPV.

Spray Precipitation: Once the HSPV is primed with antisolvent such that the vortex produced by the shear is at the volume of 300±40 milliliters, the valve to the pressure vessel is opened. A pressure of 60 psi on the 3% PPE/SIS solution produces a polymer solution mist cone with a flow rate of 30 mL/min. The PPE/(SI+SIS) solution mist cone is adjusted so that it sprays directly into the antisolvent vortex.

Post Precipitation Particle Processing: The precipitate is allowed to settle. The solvent is decanted. The remaining particle suspension is vacuum filtered. The filter cake is washed continuously with MeOH prohibiting it from drying completely. The filter cake is removed from the funnel and resuspended in 4 L of MeOH using a high shear mixer for no less than one hour. The apparatus described above as suitable for use as a high shear precipitation vessel may be used as the high shear mixer. The particle suspension is then refiltered and washed continuously with MeOH. The filter cake is allowed to dry on the second filtration and is collected from the filter and placed in a vacuum oven at 40° C. for 24 hours. Thermal Gravimetric Analysis (TGA) or Dynamic Scanning Calorimetry (DSC) is performed to determine if there is bound solvent on the polymer. Once it is confirmed that the polymer is dry it is sheared using a high shear Waring lab blender and sifted through a 40 micrometer sieve using an auto-sifter.

Figure 1:
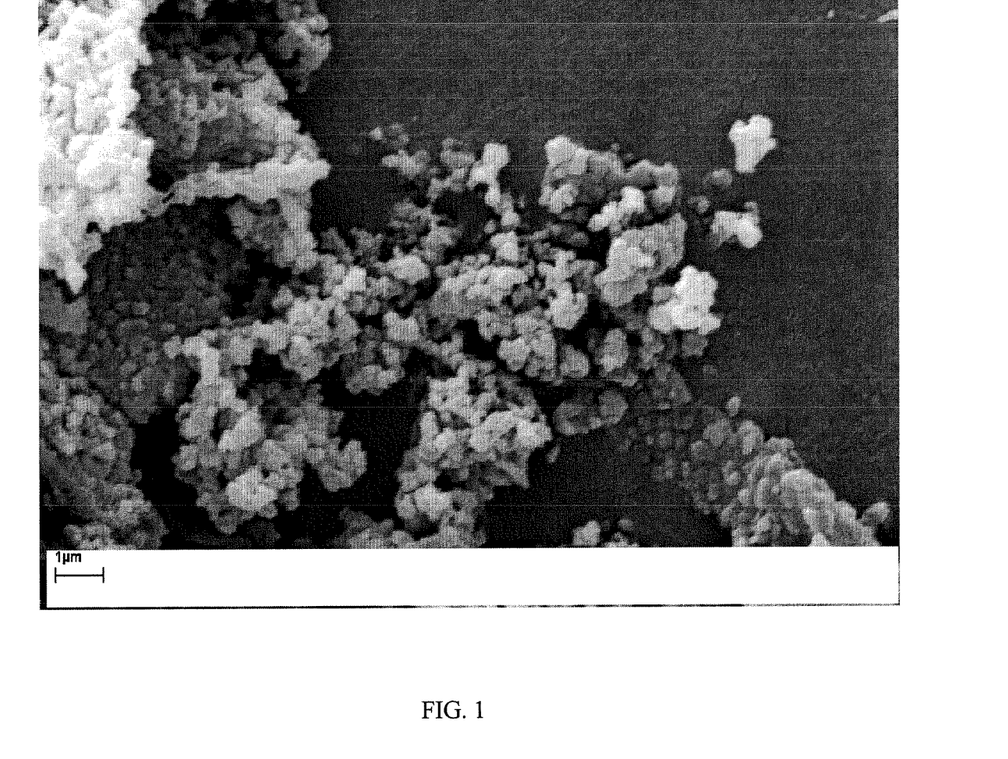
FIG. 1 is a Scanning Electron Micrograph (SEM) of particles having a poly(arylene ether) core and a polystyrene-polyisoprene-polystyrene triblock copolymer shell.
Figure 2:
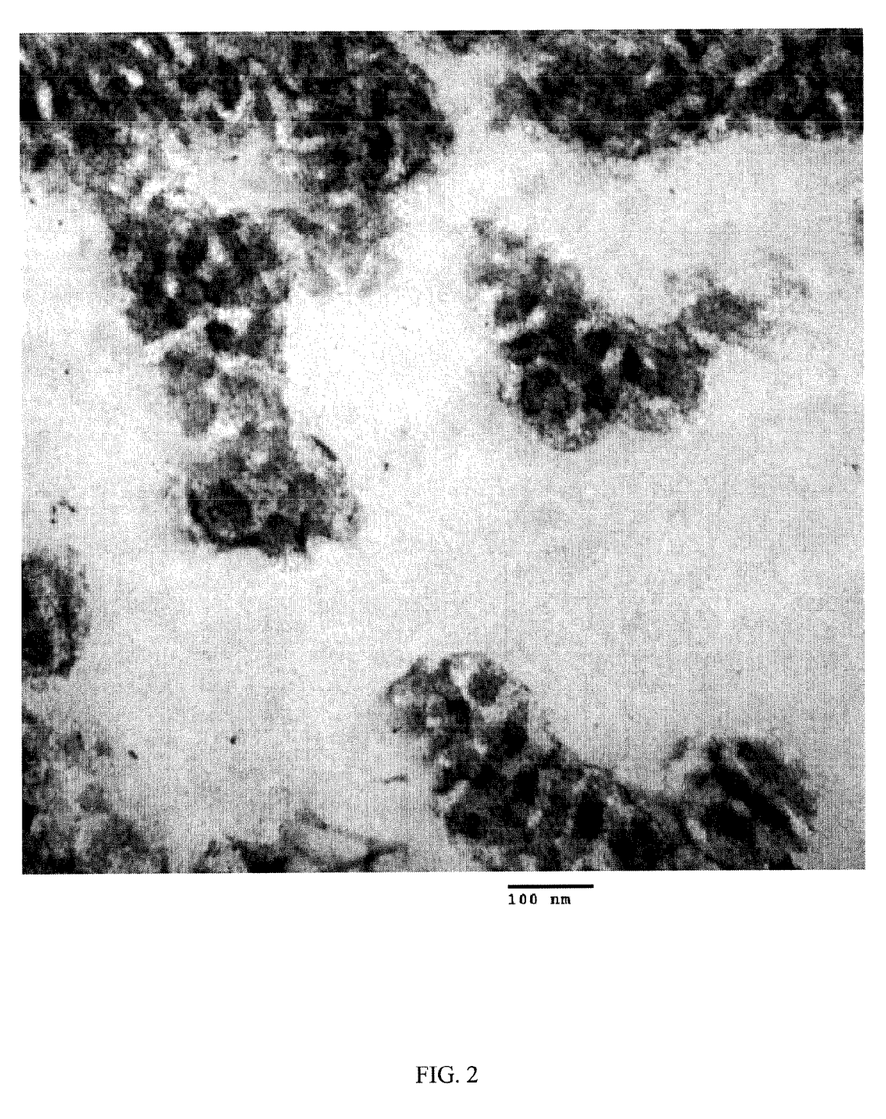
FIG. 2 is a Transmission Electron Micrograph (TEM) of the same particles after treatment with an osmium tetroxide stain.

This example demonstrates the preparation of a core-shell particle with a poly(arylene ether) core coated with an isoprene shell. Dynamic Scanning Calorimetry (DSC) of particles prepared by a similar method show that the glass transition temperature ($T_g$) of the PPE core has been reduced from 211° C. to 201° C. due to incorporation of styrenic blocks into PPE core of the particle. FIG. 1 shows a Scanning Electron Micrograph (SEM) of the resulting particles, and FIG. 2 shows a Transmission Electron Micrograph (TEM) of the resulting particles after they have been submitted to an osmium tetroxide stain. The osmium tetroxide preferentially stains the olefinically unsaturated domains, so the FIG. 2 micrograph shows that the particles are coated with the unsaturated polyisoprene block of the SI+SIS copolymer.

EXAMPLE 2

Comparative Example 1

These examples demonstrate the effectiveness of the inventive particles in reducing in a heat build up (HBU) in a rubber composition. Vulcanized rubber samples for both compositions were prepared in an identical manner according to ASTM D 3182-89 using the formulations listed in Table 1, where all amounts are specified in parts per hundred weight rubber (phr). The amount of filler per hundred weight rubber was held constant between the two compositions. The Example 2 composition had a filler consisting of carbon black, the poly(arylene ether) content of the core-shell particles, and the polystyrene content of the polystyrene-polyisoprene-polystyrene triblock copolymer of the core-shell particles (the polyisoprene content of the core-shell particles was counted as part of the rubber). The weight basis for the Example 2 rubber consisted of the sum of amounts of natural rubber and the polyisoprene content of the polystyrene-polyisoprene-polystyrene triblock copolymer of the core-shell particles. The Comparative Example 1 composition had a filler consisting of carbon black. The weight basis for the Comparative Example 1 rubber consisted solely of the natural rubber. Natural rubber ("NR") was obtained as Standard Malaysian Rubber Grade L (ASTM D 2227-96) from OSi Company (Tarrytown, N.Y.); carbon black having a surface area of 120 meter-squared per gram ($m^2/g$) was obtained as VULCAN® 9 N110 ("N110") from Cabot Corporation; stearic acid was obtained from Witco/Crompton; zinc oxide was obtained from Zinc Corporation of America; the antioxidant FLEXZONE® 7P and SUNPROOF® Improved wax were obtained from Crompton-Uniroyal Chemical; the antiozonant N,N'-diphenyl-p-phenylene diamine ("DPPD") was obtained from Uniroyal; core-shell particles having a surface area of 50 $m^2/g$ and comprising 70 weight percent poly(2,6-dimethyl-1,4-phenylene ether) ("PPE"; intrinsic viscosity 0.3 deciliter per gram, obtained from GE Plastics) and 30 weight percent of a mixture of polystyrene-polyisoprene diblock copolymer and polystyrene-polyisoprene-polystyrene triblock copolymer (SI+SIS; obtained as KRATON® D1113P from Kraton Polymers and having a polystyrene ("PS") content of 16 weight percent and a polyisoprene ("PI") content of 84 weight percent) were prepared according to the method of Example 1; elemental sulfur vulcanizing agent was obtained as Redball Rubbermakers sulfur from Harwick Standard; N-t-butyl-2-benzothiazolesulfenamide ("TBBS") was obtained as SANTOCURE® TBBS from Flexsys.

The rubber formulations were first mixed in a water-cooled Brabender mixer bowl with Banbury type B blades. The vulcanizing agent package was added on a two-mill roll, and the final productive mix was cured according to ASTM D 3182 using a Carver electrically heated hydraulic press at 400,000 pounds pressure and 160° C. For each sample, the press was pre-heated to 160° C. A single cavity mold with dimensions 0.1905 centimeter×15.2273 centimeters×15.2273 centimeters (0.075 inch×5.9950 inch×5.9950 inch) was used. A preformed plaque with initial thickness 0.203-0.254 centimeter (0.08-0.10 inch) was prepared from room temperature, grain-oriented rubber using a preform stamp and scissors. The grain orientation was marked on the preform using a silver-colored marker. The preform was sandwiched between two pieces of biaxially oriented poly(ethylene terephthalate) (MYLAR®) film. A timer was set to a cure time, designated T95, which is the cure time corresponding to 95% of complete cure. The press was opened and the preform sandwich was inserted. The press was closed and the timer started. At the end of the cure time, the press was opened and the cured plaque was immediately transferred to a room temperature water bath to cool.

Two batches were prepared and molded for each composition, and the standard deviations presented for property values in Table 1 represent variation between the two batches. Tensile modulus values, expressed in megapascals (MPa) and indicative of reinforcement, were measured at 23° C. according to ASTM D 412-98a, Method A, Die C on a 4505 Instron with Series 9 software, pneumatic grips, a long travel (250 mm) Instron contact extensometer and a Mitutoyo micrometer interfaced with the machine. Three tensile bars were die cut from a cured rubber plaque using a clicker press and ASTM D412-C-IMP die. Using a digital micrometer, a thickness measurement was taken at three points within the gauge section, and the three thickness measurements were automatically averaged by the software.

Tan delta values were determined from temperature sweep data, and values of tan delta max and delta G' at 60° C. were determined from strain sweep data as follows. An 8-millimeter cookie was cut from the cured rubber plaque using a hole punch. The sample was glued with LORD CA8000 cyanoacrylate adhesive to an 8-millimeter platen. The dynamic mechanical analysis (DMA) instrument was heated to 60° C. under a constant normal force of 100 grams. Strain sweeps were run on the sample at a frequency of 1 Hertz, a temperature of 60° C., and strain from 0.011 to 50%, until the curves overlaid each other (a minimum of five runs). Data used was from the last strain sweep. After the final strain sweep the temperature was set to −60° C. under a constant normal force of 100 grams. A temperature sweep was run at a frequency of 10 Hertz, a strain of 1%, a normal force of 200 grams from a temperature of −60 to 80° C. After the test the sample was brought to room temperature and peeled away from the platens, the platens were polished clean with fine grade sand paper in a figure eight motion and wiped with acetone in preparation for the next measurement. Tan delta at −40° C. is indicative of wear, with higher values being better. Tan delta at 0° C. is indicative of wet braking performance, with higher values being better. Tan delta at 60° C. is indicative of rolling resistance, with lower values being better.

Tear strength values, expressed in Newtons per millimeter (N/mm), were determined according to ASTM D624-00 on a 4505 Instron with Series 9 software, pneumatic grips, a long travel (250 millimeter) Instron contact extensometer and a Mitutoyo micrometer interfaced with the machine. Three test samples were cut from a cured rubber plaque using an ASTM D 624-00 type C punch die. Using a digital micrometer, a thickness measurement was taken at 3 points within the gauge section the three thickness measurements were automatically averaged by the software.

Heat build-up values, expressed in degrees centigrade, were determined according to ASTM D 623-99, Method A under the following conditions: 105° C. (221° F.) base thermocouple temperature; 0.4445 centimeter (0.175 inch) stroke length; 244.65 Newton (55 pound-force) static load; 25 minute run time.

Abrasion loss values, expressed in cubic millimeters ($mm^3$), were determined according to ASTM D 5963-04, Test Method B at 23° C. and 50% relative humidity using a 40-meter abrasion path length.

The results, presented in Table 1, show that Example 2, with a reinforcing mixture of core-shell particles and carbon black, exhibited comparable or superior reinforcement compared to the pure carbon black reinforcement in Comparative Example 2. The results also show that the heat build up (HBU) value was significantly lower for Example 2 than for Comparative Example 1. The core-shell particles thus provide a surprising reduction in heat build up. It is also surprising that, relative to Comparative Example 1, the Example composition comprising the core-shell particles exhibits a lower value of tan delta at 60° C., a lower value of tan delta max, a lower Delta G' value, and a higher die tear strength using die C.

TABLE 1

| | Amount (phr) | |
|---|---|---|
| Component | Ex. 2 | C. Ex. 1 |
| Composition | | |
| NR | 95.88 | 100.00 |
| N110 | 38.00 | 50.00 |
| Stearic acid | 2.00 | 2.00 |
| Zinc oxide | 3.00 | 3.00 |
| FLEXZONE ® 7P | 1.50 | 1.50 |
| DPPD | 1.00 | 1.00 |
| SUNPROOF ® Improved wax | 2.50 | 2.50 |
| PPE from core-shell particles | 11.30 | 0.00 |
| PI from core-shell particles | 4.12 | 0.00 |
| PS from core-shell particles | 0.73 | 0.00 |
| Sulfur | 1.65 | 1.65 |
| TBBS | 1.00 | 1.00 |
| Properties | | |
| Tensile modulus at 25% elongation (MPa) | 1.15 ± 0.03 | 1.04 ± 0.05 |
| Tensile modulus at 50% elongation (MPa) | 1.69 ± 0.03 | 1.42 ± 0.05 |
| Tensile modulus at 100% elongation (MPa) | 3.12 ± 0.04 | 2.44 ± 0.08 |
| Tensile modulus at 200% elongation (MPa) | 7.44 ± 0.17 | 6.56 ± 0.15 |
| Tensile modulus at 300% elongation (MPa) | 12.74 ± 0.25 | 12.15 ± 0.11 |
| Tensile modulus at 400% elongation (MPa) | 18.69 ± 0.24 | 18.15 ± 0.07 |
| Tensile modulus at break (MPa) | 26.57 ± 1.03 | 27.29 ± 0.92 |
| Maximum elongation (%) | 531.45 ± 15.06 | 570.45 ± 13.79 |
| Reinforcement index, 300/100 | 4.08 ± 0.03 | 4.98 ± 0.11 |
| Reinforcement index, 300/25 | 11.12 ± 0.09 | 11.66 ± 0.40 |
| Tan delta at −40° C. | 0.56 ± 0.01 | 0.54 ± 0.05 |
| Tan delta at 0° C. | 0.14 ± 0.003 | 0.16 ± 0.002 |
| Tan delta at 60° C. | 0.12 ± 0.003 | 0.16 ± 0.009 |
| Tan delta max | 0.22 ± 0.003 | 0.28 ± 0.01 |
| Delta G' at 60° C. (dynes/$cm^2$) | $(5.53 ± 0.4) × 10^7$ | $(7.24 ± 0.36) × 10^7$ |
| Tear test, die B (N/mm) | 153.7 ± 4.1 | 155.6 ± 1.1 |
| Tear test, die C (N/mm) | 117.75 ± 5.16 | 93.67 ± 1.94 |
| Heat build up (° C.) | 19.44 ± 0.95 | 24.44 ± 1.14 |
| Abrasion loss ($mm^3$) | 138.77 ± 0.93 | 135.86 ± 5.63 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A rubber composition comprising:
   a rubber containing ethylenic unsaturation;
   core-shell particles comprising a core comprising a poly(arylene ether), and a shell comprising an ethylenically unsaturated copolymer; wherein the core-shell particle comprises about 20 to about 80 weight percent of the poly(arylene ether) and about 20 to about 80 weight percent of the ethylenically unsaturated copolymer; and
   a vulcanizing agent;
   wherein the rubber composition is vulcanizable.

2. The rubber composition of claim 1, wherein the rubber containing ethylenic unsaturation is chosen from natural rubbers, synthetic rubbers, and mixtures thereof.

3. The rubber composition of claim 1, wherein the rubber containing ethylenic unsaturation comprises a diene-based synthetic rubber.

4. The rubber composition of claim 1, wherein the poly(arylene ether) comprises repeating structural units having the formula wherein for each structural unit, each $Z^1$ is independently halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_2$-$C_{12}$ halohydrocarbyloxy wherein at least two carbon atoms separate the halogen and oxygen atoms; and each $Z^2$ is independently hydrogen, halogen, primary or secondary $C_1$-$C_{12}$ alkyl, $C_1$-$C_{12}$ aminoalkyl, $C_1$-$C_{12}$ hydroxyalkyl, phenyl, $C_1$-$C_{12}$ haloalkyl, $C_1$-$C_{12}$ hydrocarbyloxy, or $C_2$-$C_{12}$ halohydrocarbyloxy wherein at least two carbon atoms separate the halogen and oxygen atoms.

5. The rubber composition of claim 1, wherein the poly (arylene ether) comprises a homopolymer of 2,6-dimethylphenol, a copolymer of 2,6-dimethylphenol and 2,3,6-trimethylphenol, or a mixture thereof.

6. The rubber composition of claim 1, wherein the ethylenically unsaturated copolymer comprises about 2 to about 60 weight percent of at least one first segment and about 40 to about 98 weight percent of at least one second segment.

7. The rubber composition of claim 1, wherein the ethylenically unsaturated copolymer is chosen from polystyrene-polyisoprene diblock copolymers, polystyrene-polyisoprene-polystyrene triblock copolymers, polystyrene-polybutadiene diblock copolymers, polystyrene-polybutadiene-polystyrene triblock copolymers, poly (arylene ether)-polyisoprene diblock copolymers, poly (arylene ether)-polybutadiene diblock copolymers, poly (arylene ether)-polyisoprene-poly(arylene ether) triblock copolymers, poly(arylene ether)-polybutadiene-poly(arylene ether) triblock copolymers, polystyrene-polybutadiene graft copolymers, polystyrene-polyisoprene graft copolymers, poly(arylene ether)-polybutadiene graft copolymers, poly (arylene ether)-polyisoprene graft copolymers, maleic-anhydride-grafted derivatives of the foregoing polymers, partially hydrogenated derivatives of the foregoing copolymers, and mixtures thereof.

8. The rubber composition of claim 1, wherein the ethylenically unsaturated copolymer comprises a polystyrene-polyisoprene-polystyrene triblock copolymer.

9. The rubber composition of claim 1, wherein the core-shell particles comprise less than 10 weight percent of particles or aggregates having a dimension greater than 100 micrometers.

10. The rubber composition of claim 1, wherein the core has an average diameter of about 10 nanometers to about 10 micrometers, and the shell has an average thickness of about 1 to about 500 nanometers.

11. The rubber composition of claim 1, wherein the core-shell particles comprise about 40 to about 80 weight percent of the poly(arylene ether) and about 20 to about 60 weight percent of the ethylenically unsaturated copolymer.

12. The rubber composition of claim 1, wherein the core-shell particles have a surface area of about 10 to about 500 square meters per gram.

13. The rubber composition of claim 1, comprising about 1 to about 70 parts by weight of the core-shell particles per 100 parts by weight total of the rubber containing ethylenic unsaturation and the ethylenically unsaturated copolymer.

14. The rubber composition of claim 1, wherein the vulcanizing agent is chosen from elemental sulfur, amine disulfides, polymeric polysulfides, sulfur olefin adducts, and mixtures thereof.

15. The rubber composition of claim 1, wherein the core-shell particles are grafted to the rubber through polysulfide linkages.

16. The rubber composition of claim 1, further comprising about 1 to about 50 weight percent of a filler chosen from precipitated silica, fumed silica, carbon black, and mixtures thereof, wherein the weight percent of filler is based on the total weight of the composition.

17. A rubber composition comprising:
a rubber containing ethylenic unsaturation, chosen from natural rubber, styrene-butadiene random copolymers, polybutadienes, polyisoprenes, and mixtures thereof;
core-shell particles comprising a core comprising a poly (arylene ether), and a shell comprising an ethylenically unsaturated copolymer; wherein the poly(arylene ether) comprises a homopolymer of 2,6-dimethylphenol, a copolymer of 2,6-dimethylphenol and 2,3,6-trimethylphenol, or a mixture thereof; wherein the ethylenically unsaturated copolymer comprises polystyrene-polyisoprene diblock copolymer, a polystyrene-polyisoprene-polystyrene triblock copolymer, or a mixture thereof; wherein the core-shell particle comprises about 20 to about 80 weight percent of the poly(arylene ether) and about 20 to about 80 weight percent of the ethylenically unsaturated copolymer; and wherein the core-shell particles have a surface area of about 10 to about 500 square meters per gram; and
a vulcanizing agent chosen from elemental sulfur, amine disulfides, polymeric polysulfides, sulfur olefin adducts, and mixtures thereof;
wherein the rubber composition is vulcanizable.

18. A vulcanized rubber composition obtained by vulcanizing the vulcanizable rubber composition of claim 1.

19. A vulcanized rubber composition obtained by vulcanizing the vulcanizable rubber composition of claim 17.

20. An article comprising the vulcanized composition of claim 18.

21. An article comprising the vulcanized composition of claim 19.

* * * * *